United States Patent
Xu

(10) Patent No.: US 6,794,329 B2
(45) Date of Patent: Sep. 21, 2004

(54) CATALYST ACTIVATOR

(75) Inventor: Wei Xu, Riyadh (GB)

(73) Assignee: Nova Chemicals (International) S. A. (CH)

( * ) Notice: Subject to any disclaimer, the term of this patent is extended or adjusted under 35 U.S.C. 154(b) by 0 days.

(21) Appl. No.: 10/301,377

(22) Filed: Nov. 21, 2002

(65) Prior Publication Data

US 2003/0144435 A1 Jul. 31, 2003

(30) Foreign Application Priority Data

Dec. 10, 2001 (CA) .............................................. 2364756

(51) Int. Cl.⁷ ................................................ B01J 31/14
(52) U.S. Cl. ..................... 502/164; 502/168; 502/202; 502/216
(58) Field of Search ................................. 502/202, 216, 502/164, 168, 122, 128; 526/151, 134, 137, 140, 142, 143, 146

(56) References Cited

U.S. PATENT DOCUMENTS

| | | | | |
|---|---|---|---|---|
| 3,681,441 A | * | 8/1972 | Robertson ................... 562/113 |
| 4,108,747 A | * | 8/1978 | Crivello ....................... 522/31 |
| 4,543,399 A | | 9/1985 | Jenkins, III et al. ........... 526/70 |
| 4,721,559 A | * | 1/1988 | Olah ........................... 208/135 |
| 5,084,586 A | * | 1/1992 | Farooq ........................ 556/181 |
| 5,124,417 A | * | 6/1992 | Farooq ........................ 526/90 |
| 5,352,749 A | | 10/1994 | DeChellis et al. ............ 526/68 |
| 5,434,116 A | | 7/1995 | Sone et al. .................. 502/103 |
| 5,554,775 A | | 9/1996 | Krishnamurti et al. ......... 556/7 |
| 5,559,199 A | * | 9/1996 | Abe et al. .................... 526/160 |
| 5,589,555 A | | 12/1996 | Zboril et al. .................. 526/64 |
| 5,625,087 A | * | 4/1997 | Devore et al. ............... 556/468 |
| 5,637,659 A | | 6/1997 | Krishnamurti et al. ...... 526/133 |
| 6,024,483 A | | 2/2000 | Burke et al. ................. 366/295 |
| 6,528,671 B1 | * | 3/2003 | Nabika ........................ 556/20 |

FOREIGN PATENT DOCUMENTS

| | | | | |
|---|---|---|---|---|
| EP | 0 442 635 A1 | * | 8/1991 | ........... C07F/19/00 |
| JP | 06056868 | | 7/1992 | |
| JP | 06267830 | | 12/1993 | |
| JP | 06267911 | | 12/1993 | |

OTHER PUBLICATIONS

Straus et al. J. Organomet. Chem. 1989, 369, C13–C17.*

* cited by examiner

Primary Examiner—David W. Wu
Assistant Examiner—Rip A. Lee
(74) Attorney, Agent, or Firm—Kenneth H. Johnson

(57) ABSTRACT

A two component catalyst activator comprises:

1) a Lewis acidic organoboron (or an orgonoaluminum) component; and
2) a component defined by the formula $AOSO_2R$ wherein A is a pseudo cationic group and R is a hydrocarbyl or substituted hydrocarbyl. The catalyst activator is used in combination with a transition metal catalyst for the polymerization of olefins. The catalyst activator provides improved catalyst activities. It is especially useful in solution polymerizations because of desirable solubility characteristics in comparison to the borate salts used in prior activators.

6 Claims, No Drawings

CATALYST ACTIVATOR

FIELD OF THE INVENTION

This invention relates to a two component activator for a polymerization catalyst.

BACKGROUND OF THE INVENTION

This invention relates to catalyst activation for olefin polymerizations.

It is now well known to use an aluminoxane, especially a methylaluminoxane, to activate olefin polymerization catalysts containing group 3–10 metal complexes (particularly those metal complexes which contain delocalized pi ligands and are known as "metallocene catalysts").

It is also known to use organoboron activators for olefin polymerization catalysts. Tris (pentafluorophenyl) borane, and near derivatives thereof, are particularly well known in this regard. Salts of tetrakis (pentafluorophenyl) boron are similarly employed. The tris (pentafluorophenyl) borane activators are desirable for use in solution polymerization (because of their excellent solubility). The borate salts generally offer higher polymerization activities but are difficult to use in solution polymerizations because of their low solubilities in non polar solvents.

In addition, all of the aforementioned activators are expensive.

Accordingly, it would be desirable to improve the performance of prior art activators, especially with respect to lowering the cost of the activators and improving the solubility of highly active boron activators for solution polymerizations.

SUMMARY OF THE INVENTION

The present invention provides a catalyst activator comprising:

1) a Lewis acid component defined by the formula $ML_1L_2L_3$ wherein M is boron or aluminum; each of $L_1$, $L_2$ and $L_3$ is independently selected from the group consisting of hydrocarbyl, substituted hydrocarbyl, hydrocarboxylide and substituted hydrocarboxylide; and $L_3$ is selected from the group consisting of hydrocarbyl, substituted hydrocarbyl, hydrocarboxylide, substituted hydrocarboxylide, amino, phosphido, siloxy, sulfido and halide; and 2) a second component defined by the formula $AOSO_2R$ where A is a pseudo cationic group and R is hydrocarbyl or substituted hydrocarbyl.

The activator of this invention is particularly useful for the polymerization of addition polymerizable monomers (especially monoolefins) in the presence of a transition metal catalyst. Catalysts based on group 4 metals are preferred. Thus, another embodiment of this invention provides a catalyst system comprising:

1) a catalyst activator as above; and 2) a catalyst comprising a group 3–10 metal complex.

A third embodiment of this invention provides a process for the polymerization of olefins.

DETAILED DESCRIPTION OF PREFERRED EMBODIMENTS

The activator of this invention comprises two essential components which are described in detail below.

1. $ML_1L_2L_3$ or Lewis Acid Component

The first activator component (also referred to herein as a Lewis Acid) is defined by the formula:

$$ML_1L_2L_3$$

wherein M is a metal selected from the group consisting of boron and aluminum; and ligands $L_1$ and $L_2$ are each (independently) hydrocarbyl (optionally substituted) or hydrocarboxylide (optionally substituted). The hydrocarbyl groups have from 1 to 30 carbon atoms and may be linear, branched, cyclic or aromatic. The hydrocarbyl groups may also be substituted. By way of non-limiting example, the substituents may be halide, hydrocarbyl, amino or phosphino groups.

The term hydrocarboxylide as used herein is meant to its conventional meaning, namely that there is an oxygen atom between M and the remaining of the ligand fragment. For clarity, this may be illustrated by the formula:

$$M{-}O{-}R$$

wherein M is as defined above and R is a hydrocarbyl group (optionally substituted) as described above.

Two or more of the ligands $L_1$, $L_2$ and $L_3$ may optionally be bridged so as to form a bidentate ligand. $L_3$ is a ligand which may be a hydrocarbyl (optionally substituted), hydrocarboxylide (optionally) substituted—both as described directly above, halide, amino, phosphido, siloxy or sulfido.

Preferred activator components of the formula $ML_1L_2L_3$ are tri (fluoro-hydrocarbyl) boranes and aluminum alkyls. It is preferred that aluminum alkyl (if employed) is present as a constituent of an aluminoxane mixture, as will be illustrated in the examples. Tri (isobutyl) aluminum (TIBAL) may also be employed.

It is especially preferred to use a fluoro substituted tri (hydrocarbyl) borane, particularly tris (pentafluorophenyl) borane for solution polymerizations.

2. Ionic Component

The second essential activator component is defined by the formula:

$$AOSO_2R$$

wherein A is a pseudo cationic group and R is hydrocarbyl or substituted hydrocarbyl.

A highly preferred second component is $Ph_3COSO_2CF_3$ where each Ph is a phenyl group.

Whilst not wishing to be bound by theory, it is believed that components defined by the formula $AOSO_2R$ should not be referred to as salts. For example, $Ph_3COSO_2CF_3$ decomposes in water to trityl alcohol and triflic acid (instead of the $[Ph_3C^+][OSO_2CF_3]$) which would be expected if $Ph_3COSO_2CF_3$ was a true salt).

However, for convenience, the group A is referred to herein as a pseudo cationic group (i.e. as if $AOSO_2R$ were a salt).

Using the nomenclature which is typically used to describe salts, it is preferred that A be selected from the group consisting of carbenium, ammonium, oxonium, silylium, phosphonium and sulfonium. More correctly, A may be defined as preferably being $R'_3C$ (instead of $[R'_3C^+]$ for carbenium); $R'_4N$ (instead of $(R'N)^+$ for ammonium); R'3O (instead of $[R'_3O]^+$ for oxonium; R'3Si (instead of $[R'_3Si]^+$ for silylium; R'4P (instead of $[R'_4P]^+$ for phosphonium); and R'3S (instead of $[R'3S]^+$ for sulfonium)—where R' in all of the formulae in this sentence refers to a hydrocarbyl or substituted hydrocarbyl group.

It is highly preferred that the pseudo cationic group A be $R'_3C$ or $R'_4N$.

The R group in formula $AOSO_2R$ is a hydrocarbyl having from 1 to 20 carbon atoms. It is preferably halo substituted and is most preferably $CF_3$.

Thus, the most preferred second component is $Ph_3COSO_2CF_3$ where each Ph is phenyl. $Ph_3COSO_2CF_3$ presently has a Chemical Abstract (CA) index name of methanesulfonic acid trifluoro-triphenylmethylester (or MSATFTPME). A search of Chemical Abstracts shows that MSATFTPME is a known substance and has been reported to be useful in 1) the preparation of coatings (Japanese Patent 2954442 B2, issued Sep. 27, 1999 from Kokai JP 06267911); 2) the preparation of oxy-amino sugars (ref: Japanese Kokai JP 06056868 A2, dated Mar. 1, 1994); and 3) the preparation of X-ray masks (ref: Japanese Kokai JP 062627830 A2, dated Sep. 22, 1994).

In general, the amount of second component (i.e. $AOSO_2R$) which is used in the activators of this invention is from about 0.5 to 5.0 moles per mole of the metal M (i.e. boron or aluminum) contained in the three coordinate Lewis acid component. The second component is preferably used in an approximately equimolar amount with the metal M. However, the second component may be used in excess (especially when a boron containing Lewis acid is used in a solution polymerization) or the metal M may be in excess (especially when an aluminum alkyl is used as the Lewis acid component).

The two components may be added separately (or alternatively together) to the polymerization reaction. Another alternative is to co-support the two components on a polymerization catalyst support for use in a slurry or gas phase polymerization (as well be illustrated in the Examples).

A. Supported and Unsupported

The activator of this invention may be used in a supported form or in an unsupported form.

It is particularly preferred to use the catalyst activator of this invention in un-supported form in a solution polymerization process. When doing so, it is especially preferred to use a tri (fluorosubstituted aryl) borane as the aforedefined $ML_1L_2L_3$ component. Examples of such boranes include monoalkyl bis (fluorophenyl) borane and dialkyl mono (pentafluorophenyl) borane. The most preferred borane is tris (pentafluorophenyl) borane. The preferred second component for use with these boranes is $Ph_3OSO_2CF_3$.

The activator produced from these two components is extremely active, as will be illustrated in the examples. In addition, the two components have good solubility in the solvents which are typically used in a solution polymerization process.

Thus, the activator of this invention has significant advantages in comparison to the known fluoroboranes (such as $B(C_6F_5)_3$) or salts thereof (such as $[Ph_3C][B(C_6F_5)_4]$, trityl borate) when used in a solution polymerization process. Most notably the boranes (such as $B(C_6F_5)_3$) are convenient to use because of high solubility but often provide comparatively low catalyst productivity in comparison to the analogous salts (such as trityl borate). The two components activators of the present invention have very good solubility characteristics and further provide a highly productive catalyst activation.

It is preferred to use a "supported" form of the present activator when a slurry or gas phase polymerization process is used. Techniques to prepare supported catalysts are well known to those skilled in the art. In general, the activator and catalyst are deposited upon a particulate support which may be (for example) prepared from a metal oxide or polymeric material. Metal oxides are preferred.

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides which are well known for use in olefin polymerization catalysts and are preferred for reasons of cost and convenience. Silica is particularly preferred.

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides which have comparatively high surface areas (greater than 1 $m^2/g$, particularly greater than 100 $m^2/g$, more particularly greater than 200 $m^2/g$) are preferred to non-porous metal oxides.

Conventional calcining conditions may be employed—i.e. calcining temperatures of from about 150° C. to about 900° C. for periods of time ranging from about 10 minutes to about 48 hours. Preferred calcining conditions include temperatures of from 200° C. to 700° C. for times of from 1 to 8 hours.

It is preferred to use an aluminum alkyl as the essential $ML_1L_2L_3$ component of this invention when the activator is used in supported form. It is particularly preferred to provide the aluminum alkyl as a constituent of an aluminoxane. Many conventional (and commercially available) aluminoxanes contain from 5 to 30 mole % aluminum alkyl (expressed as the molar percentage of aluminum which is present as aluminum alkyl divided by the total molar quantity of aluminum in the aluminoxane).

Aluminoxanes are readily available items of commerce which are known to be cocatalysts for olefin polymerization catalyst (especially group 4 metal metallocene catalysts). A generally accepted formula to represent aluminoxanes is:

$$(R)_2AlO(RAlO)_mAl(R)_2$$

wherein each R is independently an alkyl group having from 1 to 6 carbon atoms and m is between 0 and about 50. The preferred aluminoxane is methylaluminoxane wherein R is predominantly methyl. Commercially available methylaluminoxane ("MAO") and "modified MAO" are preferred for use in this invention. [Note: In modified MAO, the R groups of the above formula are predominantly methyl but a small fraction of the R groups are higher hydrocarbyls—such as ethyl or butyl—so as to improve the solubility of the "modified MAO" in aliphatic solvents.]

The metal oxide and aluminoxane are contacted together preferably using conventional techniques such as mixing the aluminoxane and metal oxide together in a linear or aromatic hydrocarbon (such as hexane or toluene) at a temperature of from 10 to 200° C. for a time if from one minute to several hours). The amount of aluminoxane (based on the combined weight of the aluminoxane and the metal oxide).

The resulting activator is suitable for use in olefin polymerization reactions when combined with a polymerization catalyst. Any polymerization catalyst, which is activated by an aluminoxane or a borane or boron activator, may be employed. Preferred catalysts include olefin polymerization catalysts which contain group 4 metals (such as Ti, Hf or Zr), group 5 metals (especially V), Fe, Ni, Cr and Pd. Highly preferred catalysts contain a group 4 metals and at least one delocalized, pi-bonded ligand. It is especially preferred to provide an Al:$M_e$ mole ratio of from 10:1 to 200:1, especially 50:1 to 150:1 in the finished, supported catalyst complex (where Al is the aluminum provided by the aluminoxane and $M_e$ is the group 4 metal). The catalyst support containing the aluminoxane may be co-supported with the polymerization catalyst using techniques which are conventionally used to prepare supported aluminoxane/metallocene catalysts. Such techniques are well known to those skilled in the art. In general, a hydrocarbon slurry of the catalyst component may be contacted with the catalyst complex. It is preferred to use a hydrocarbon in which the catalyst complex is soluble. The examples illustrate suitable techniques to prepare the "catalyst systems" of this invention.

Particularly preferred catalysts are group 4 metal catalysts defined by the formula:

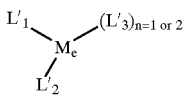

wherein $M_e$ is selected from titanium, hafnium and zirconium; each $L'_3$ is an activatable ligand; $L'_1$ and $L'_2$ are independently selected from the group consisting of cyclopentadienyl, substituted cyclopentadienyl (including indenyl and fluorenyl) and heteroatom ligands, with the proviso that $L'_1$ and $L'_2$ may optionally be bridged together so as to form a bidentate ligand. It is further preferred that n=2 (i.e. that there are 2 monoanionic activatable ligands).

As previously noted, each of $L'_1$ and $L'_2$ may independently be a cyclopentadienyl ligand or a heteroatom ligand. Preferred catalysts include metallocenes (where both $L'_1$ and $L'_2$ are cyclopentadienyl ligands which may be substituted and/or bridged) and monocyclopentadienyl heteroatom catalysts (especially a catalyst having a cyclopentadienyl ligand and a phosphinimine ligand), as illustrated in the Examples. Brief descriptions of exemplary ligands are provided below.

Cyclopentadienyl Ligands $L'_1$ and $L'_2$ may each independently be a cyclopentadienyl ligand. As used herein, the term cyclopentadienyl ligand is meant to convey its broad meaning, namely a substituted or unsubstituted ligand having a five carbon ring which is bonded to the metal via eta-5 bonding. Thus, the term cyclopentadienyl includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^1)_3$ wherein each $R^1$ is independently selected from the group consisting of hydrogen, a $C_{1-8}$ alkyl or alkoxy radical $C_{6-10}$ aryl or aryloxy radicals; germanyl radicals of the formula Ge—$(R^1)_3$ wherein $R^1$ is as defined directly above.

Activatable Ligand

Each $L'_3$ is an activatable ligand. The term "activatable ligand" refers to a ligand which may be activated by a cocatalyst or "activator" (e.g. the aluminoxane) to facilitate olefin polymerization. Exemplary activatable ligands are independently selected from the group consisting of a hydrogen atom, a halogen atom, a $C_{1-10}$ hydrocarbyl radical, a $C_{1-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. As previously noted, the preferred catalysts contain a group 4 metal in the highest oxidation state (i.e. 4+) and the preferred activatable ligands are monoanionic (such as a halide—especially chloride, or an alkyl—especially methyl). Thus the preferred catalyst contains two activatable ligands. In some instances, the metal of the catalyst component may not be in the highest oxidation state. For example, a titanium (III) component would contain only one activatable ligand. Also, it is permitted to use a dianionic activatable ligand although this is not preferred.

Heteroatom Ligands

As used herein, the term heteroatom ligand refers to a ligand which contains a heteroatom selected from the group consisting of nitrogen, boron, oxygen, phosphorus and sulfur. The ligand may be sigma or pi bonded to the metal. Exemplary heteroatom ligands include phosphinimine ligands, ketimide ligands, siloxy ligands amido ligands, alkoxy ligands, boron heterocyclic ligands and phosphole ligands. Brief descriptions of such ligands follow:

Phosphinimine Ligand

Phosphinimine ligands are defined by the formula:

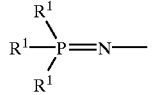

wherein each $R^1$ is independently selected from the group consisting of a hydrogen atom, a halogen atom, a $C_{1-8}$ alkoxy radical, one $C_{6-10}$ aryl or aryloxy radical, an amido radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein each $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

Ketimide Ligands

As used herein, the term "ketimide ligand" refers to a ligand which:

a) is bonded to the group 4 metal via a metal-nitrogen atom bond;

b) has a single substituent on the nitrogen atom, (where this single substituent is a carbon atom which is doubly bonded to the N atom); and c) has two substituents (Sub 1 and Sub 2, described below) which are bonded to the carbon atom.

Conditions a, b and c are illustrated below:

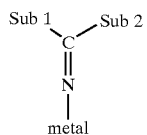

The substituents "Sub 1" and "Sub 2" may be the same or different. The substituents may be bonded together—i.e. it is permissible to include a bond which bridges Sub 1 and Sub 2. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Siloxy Heteroligands

These ligands are defined by the formula:

where the — denotes a bond to the transition metal and $\mu$ is sulfur or oxygen.

The substituents on the Si atom, namely $R_x$, $R_y$ or $R_z$ is not especially important to the success of this invention. It is preferred that each of $R_x$, $R_y$ and $R_z$ is a $C_{1-4}$ hydrocarbyl group such as methyl, ethyl, isopropyl or tertiary butyl (simply because such materials are readily synthesized from commercially available materials).

Amido Ligands

The term "amido" is meant to convey its broad, conventional meaning, Thus, these ligands are characterized by (a) a metal-nitrogen bond; and (b) the presence of two substituents (which are typically simply alkyl or silyl groups) on the nitrogen atom.

Alkoxy Ligands

The term "alkoxy" is also intended to convey its conventional meaning. Thus these ligands are characterized by (a) a metal oxygen bond; and (b) the presence of a hydrocarbyl group bonded to the oxygen atom. The hydrocarbyl group may be a ring structure and/or substituted (e.g. 2, 6 di-tertiary butyl phenoxy).

Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example U.S. Pat. Nos. 5,637,659; 5,554,775 and the references cited therein).

Phosphole Ligands

The term "phosphole" is also meant to convey its conventional meaning. "Phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents), phosphido radicals, amido radicals, silyl or alkoxy radicals.

Phosphole ligands are also well known to those skilled in the art of olefin polymerization and are described as such in U.S. Pat. No. 5,431,116 (Sone to Tosoh).

Polymerization Processes

This invention is suitable for use in any conventional olefin polymerization process, such as the so-called "gas phase", "slurry", "high pressure" or "solution" polymerization processes. Polyethylene, polypropylene and ethylene propylene elastomers are examples of olefin polymers which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to about 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts of up to 10 weight % of the polymer although typically is present in amounts from about 3 to 5 weight %. The resulting polymer may have a composition comprising from 40 to 75 weight % of ethylene, from 50 to 15 weight % propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one ore more $C_{4-10}$ alpha olefins, preferably selected from the group consisting of 1-butene, 1-hexene and 1-octene. The polyethylene prepared in accordance with the present invention might also be useful to prepare polyethylene having a density below 0.910 g/cc—the so-called very low and ultra low density polyethylenes.

The supported form of the catalyst system of this invention is preferably used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant—and highly undesirable—"reactor chunks"). The obvious way to maintain good mixing and cooling is to have a very high monomer flow through the bed. However, extremely high monomer flow causes undesirable polymer entertainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and amount of such condensed fluid preferably does not exceed about 20 weight percent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

It is preferred to use tris (pentafluorophenyl) borane as the Lewis acid (and $Ph_3COSO_2CF_3$ as the second activator component) in combination with a catalyst comprising a group 4 metal complex when employing solution polymerization conditions. The molar ratio of the boron to the group 4 metal is preferably from 0.5/1 to 5/1. An aluminoxane (especially MAO) may also be included in an amount sufficient to scavenge the polymerization medium of adventious impurities.

Highly preferred group 4 metal catalysts contain at least one delocalized pi ligand (such as a cyclopentadienyl ligand which may be substituted) and/or a phosphinimine ligand.

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

Preferred solution polymerization processes use at least two polymerization reactors. The polymer solution exiting from the first reactor is preferably transferred to the second polymerization (i.e. the reactors are most preferably arranged "in series" so that polymerization in the second reactor occurs in the presence of the polymer solution from the first reactor).

The polymerization temperature in the first reactor is from about 80° C. to about 180° C. (preferably from about 120° C. to 160° C.) and the second reactor is preferably operated at a higher temperature. Cold feed (i.e. chilled solvent and/or monomer) may be added to both reactors or to the first reactor only. The polymerization enthalpy heats the reactor. The polymerization solution which exits the reactor may be more than 100° C. hotter than the reactor feed temperature. The polymerization reactor(s) are preferably "stirred reactors" (i.e. the reactors are extremely well mixed with a good agitation system). Agitation efficiency may be determined by measuring the reactor temperature at several different points. The largest temperature difference (i.e. between the hottest and coldest temperature measurements) is described as the internal temperature gradient for the polymerization reactor. A very well mixed polymerization reactor has a maximum internal temperature gradient of less than 10° C. A particularly preferred agitator system is described in co-pending and commonly assigned U.S. Pat. No. 6,024,483. Preferred pressures are from about 500 psi to 8,000 psi. The most preferred reaction process is a "medium pressure process", which means that the pressure in each reactor is preferably less than about 6,000 psi (about 42,000 kiloPascals or kPa), and most preferably from about 1,500 psi to 3,000 psi (about 14,000–22,000 kPa).

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. Octene-1 is highly preferred.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.). The residence time in each reactor will depend on the design and the capacity of the reactor. Generally the reactors should be operated under conditions to achieve a thorough mixing of the reactants. In addition, it is preferred (for dual reactor operations) that from 20 to 60 weight % of the final polymer is polymerized in the first reactor, with the balance being polymerized in the second reactor. As previously noted, the polymerization reactors are preferably arranged in series (i.e. with the solution from the first reactor being transferred to the second reactor). In a highly preferred embodiment, the first polymerization reactor has a smaller volume than the second polymerization reactor. On leaving the reactor system the solvent is removed and the resulting polymer is finished in a conventional manner.

Further details are provided by the following non-limiting examples.

EXAMPLES

The invention will now be illustrated in further detail by way of the following non-limiting examples. For clarity, the examples have been divided into two parts, namely Part A (Compound Synthesis) and Part B (Polymerization).

Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight (Mn) and weight average molecular weight (Mw), respectively.

The following abbreviations are used in the Examples:

| | |
|---|---|
| $^1$H NMR = | proton nuclear magnetic resonance |
| $^{13}$C NMR = | carbon 13 nuclear magnetic resonance |
| Hr = | hour |
| Mw = | weight average molecular weight |
| Mn = | number average molecular weight |
| PD = | polydispersity (or Mw/Mn) |
| PE = | polyethylene |
| PO = | polyolefin |
| t-Bu = | tertiary butyl (e.g. $^tBu_3$ = tri-tertiary butyl) |
| i-Pr = | isopropyl |
| Ph = | phenyl |
| Me = | methyl |
| THF = | tetrahydrofuran |
| MeOH = | methanol |
| TIBAL = | triisobutylaluminum, purchased from Akzo Nobel |

Part A: Compound Synthesis

All the compounds were considered to be oxygen and moisture sensitive. Manipulations were therefore carried out under nitrogen using a glovebox or under argon using Schenk techniques. Anhydrous toluene was purchased from Aldrich and purified over conventional mole sieves. Methylaluminoxanes were purchased from Akzo-Nobel (MMAO-7) and Albemarle (AB-MAO). The MMAO-7 contained approximately 20–25% "free" trimethyl aluminum (as determined by the vendor using a pyridine titration technique).

A.2 Synthesis of $Ph_3COSO_2CF_3$ $CH_2Cl_2$ (50 mL) solution of $Ph_3CCl$ (1.38 g, 4.96 mmol) was added to a stirred $CH_2Cl_2$ (50 mL) slurry of $AgSO_3CF_3$ (1.28 g, 4.96 mmol) slowly at 0° C. The mixture was warmed up to room temperature and stirred for 12 hours. The precipitate was removed by a filtration. The $CH_2Cl_2$ was evaporated under vacuum to dryness to give an orange solid (1.3 g, 67% Yield). $^1H$ NMR ($CDCl_3$, δ): 7.4 (m, 9H), 7.6 (m, 6H). $^{19}F$ NMR ($CDCl_3$, δ): −80.0 (s).

A.3 Synthesis of i-$Pr_3SiOSO_2CF_3$ Modified MMAO-7 i-$Pr_3SiOSO_2CF_3$ (539 mg, 1.761 mmol) was added slowly to MMAO-7 (9.797 g, 6.88% weight Al in heptane, Al:Si=14:1). The mixture was stirred for 12 hours before used for olefin polymerization.

A.4 Synthesis of i-$Pr_3SiOSO_2CF_3$ Modified AB-MAO i-$Pr_3SiOSO_2CF_3$ (777 mg, 2.578 mmol) was added slowly to AB-MAO (6.49 g, 4.51% weight Al in heptane, Al:Si=6:6). The mixture was stirred for 12 hours before used for olefin polymerization.

A.5 Synthesis of $Ph_3COSO_2CF_3$ Modified AB-MAO $Ph_3COSO_2CF_3$ (102 mg, 0.26 mmol) was added slowly to AB-MAO (10.00 g, 4.51% weight Al in heptane, Al:Si=6:4). The mixture was stirred for one hour before used for olefin polymerization.

Part B: Polymerizations

Solution and Slurry Batch Reactor Results

All the polymerization experiments described below were conducted using a 500 ml stainless steel autoclave. All the chemicals (solvent, catalyst and cocatalyst) were fed into the reactor batchwise except ethylene which was fed on demand. No product was removed during the polymerization reaction. The feed streams (ethylene, cyclohexane) were purified prior to feeding into the reactor by contact with various absorption media to remove impurities such as water, oxygen, sulfur and polar materials. All components were stored and manipulated under an atmosphere of purified argon or nitrogen. Ethylene polymerizations were performed in the reactor equipped with an air driven stirrer and an automatic temperature control system. The polymerization reaction time is 10 minutes for each experiment. The polymerization was terminated by adding 5 ml of methanol to the reactor and the polymer was recovered by evaporation of the solvent or by drying it under vacuum. The polymerization activities were calculated based on the weight of the polymer produced. All reported pressures are gauge pressures. Triisobutylaluminum (TIBAL) was purchased from Aldrich and $[CPh_3][B(C_6F_5)_4]$ was purchased from Asahi Glass Inc.

B.3 Polymerization with $Ph_3COSO_2CF_3$

Cyclohexane (300 mL) was transferred into the reactor with TIBAL (0.3 mmol). The solution was heated to 35° C. and saturated with 10 pounds per square inch gauge (psig) of ethylene. A toluene solution of (t-$Bu_3$PN)$CpTiMe_2$ (0.00300 mmol) and a toluene mixture of $Ph_3COSO_2CF_3$ (0.00315 mmol) and $B(C_6F_5)_3$ (0.00315 mmol) were injected into the reactor via syringes. Polymerization temperature increased to 48° C. After 10 minutes, polyethylene (10.6 g) was produced. Activity=21200 gPE/mmol−Ti*hr.

B.4 Comparative Example with $Ph_3C[B(C_6F_5)_4]$

Cyclohexane (300 mL) was transferred into the reactor with TIBAL (0.3 mmol). The solution was heated to 35° C. and saturated with 10 pounds per square inch gauge (psig) of ethylene. A toluene solution of (t-$Bu_3$PN)$CpTiMe_2$ (0.00300 mmol) and a toluene solution of $Ph_3C[B(C_6F_5)_4]$ (0.00315 mmol) was injected into the reactor via syringes. Polymerization temperature increased to 50° C. After 10 minutes, polyethylene (6.8 g) was produced. Polymerization activity is 13600 gPE/mmol−Ti*hr.

B.5 Polymerization with i-$Pr_3SiOSO_2CF_3$ Modified MMAO-7

Cyclohexane (216 mL) and i-$Pr_3SiOSO_2CF_3$ modified MMAO-7 (5.368 g, 6.52% weight Al) were transferred into the reactor. The solution was heated to 160° C. and saturated with 140 psig of ethylene and stirred at 2000 rpm. A toluene solution of (t-$Bu_3$PN)$CpTiCl_2$ (17.2 mg, 0.04297 mmol) was injected into the reactor via syringes. Polymerization temperature increased to 167° C. and average polymerization temperature is 160.09° C. After 10 minutes, polyethylene (13 g) was produced. Polymerization activity is 1815.1 gPE/mmol-Ti*hr.

B.6 Comparative Example with MMAO-7

Cyclohexane (216 mL and MMAO-7 (2.55 g, 13.6% weight Al) were transferred into the reactor. The solution was heated to 160° C. and saturated with 140 psig of ethylene and stirred at 2000 rpm. A toluene solution of (t-$Bu_3$PN)$CpTiCl_2$ (17.23 mg, 0.04305 mmol) was injected into the reactor via syringes. Polymerization temperature increased to 167° C. and average polymerization temperature is 159.9° C. After 10 minutes, polyethylene (10.4 g) was produced. Polymerization activity is 1450 gPE/mmol-Ti*hr.

Gas Phase Batch Reactor Results

Catalyst Preparation

Standard Schlenk and drybox techniques were used in the preparation of supported catalyst systems using (t-Bu)$_3$PNTi(Cp)Cl$_2$ as a catalyst. Solvents were purchased as anhydrous materials and further treated to remove oxygen and polar impurities by contact with a combination of activated alumina, molecular sieves and copper oxide on silica/alumina. Where appropriate, elemental compositions of the supported catalysts were measured by Neutron Activation analysis and are ported accuracy of +1% (weight basis).

The supported catalysts were prepared by supporting a MAO derivative obtained from Section A (A4, A5 or a commercially available MAO from Albemarle) on a commercially available silica support (sold under the trade-name "XPO 2408" by W. R. Grace), followed by deposition of the catalyst. The aiming point for the Al/Ti mole ratio was 120/1.

Polymerization

All the polymerization experiments described below were conducted using a semi-batch, gas phase polymerization reactor of total internal volume of 2.2 L. Ethylene gas was measured to the reactor on a continuous basis using a calibrated thermal mass flow meter, following passage through purification media as described above. Reaction pressure was set at 200 psig. A pre-determined mass of the supported catalyst sample (Table 1) was added to the-reactor under the flow of the inlet gas with no pre-contact of the catalyst with any reagent, such as a catalyst activator. The catalyst was activated in-situ (in the polymerization reactor) at the reaction temperature in the presence of the monomers, using a metal alkyl complex which has been previously added to the reactor to remove adventitious impurities. Purified and rigorously anhydrous sodium chloride (160 g) was used as a catalyst-dispersing agent. The internal reactor temperature was set at 90° C. and monitored by a thermocouple in the polymerization medium and controlled to ±1.0° C. The duration of the polymerization experiment was one hour. Following the completion of the polymerization experiment, the polymer was separated from the sodium chloride and the yield was determined.

TABLE 1

Polymerization Data

|  | MAO | Supported Catalyst[1] (mg) | Co-monomer (mL) | PE Produced (g) | Activity gPE/mmol-Ti.h.[C2] |
|---|---|---|---|---|---|
| Example 1 | i-Pr$_3$SiOSO$_2$CF$_3$ modified AB-MAO | 30 | 0 | 44.7 | 79854 |
| Example 2 | i-Pr$_3$SiOSO$_2$CF$_3$ modified AB-MAO | 21 | 5 | 40.1 | 136505 |
| Example 3 | Ph$_3$COSO$_2$CF$_3$ Modified AB-MAO | 39 | 0 | 36.4 | 66752 |
| Example 4 | Ph$_3$COSO$_2$CF$_3$ Modified AB-MAO | 17 | 5 | 57.8 | 159458 |
| Comparative Example | AB-MAO | 23 | 0 | 18.7 | 43574 |

What is claimed is:

1. A catalyst activator for olefin polymerization catalysis comprising:

1) a Lewis acid defined by the formula:

$$ML_1L_2L_3$$

wherein M is boron; each of $L_1$ and $L_2$ is independently selected from the group consisting of A) a hydrocarbyl, having from 1 to 30 carbon atoms, wherein said hydrocarbyl may contain a substituent selected from the group consisting of halide, amino or phosphino radicals; B) a hydrocarbyl radical of the formula —OR', wherein R' contains from 1 to 30 carbon atoms and may contain a substituent selected from the group consisting of halide, amino or phosphino radicals; and $L_3$ is selected from the group consisting of A) a hydrocarbyl having from 1 to 30 carbon atoms, wherein said hydrocarbyl may contain a substituent selected from the group consisting of halide, amino or phosphino radicals; B) a hydrocarbyl radical of the formula —OR', wherein R' contains from 1 to 30 carbon atoms and may contain a substituent selected from the group consisting of halide, amino or phosphino radicals; C) halide; D) amino; E) phosphido; F) siloxy; and G) sulfido; and 2) a second component defined by the formula:

$$AOSO_2R$$

wherein A is a cationic group and R is a hydrocarbyl having from 1 to 20 carbon atoms and wherein R may contain a halide substituent.

2. The catalyst activator according to claim 1 wherein each of $L_1$, $L_2$ and $L_3$ is a pentafluorophenyl ligand.

3. The catalyst activator according to claim 1 wherein said A is selected from the group consisting of R'$_3$C and R$_4$'N wherein each R' is independently selected from the group consisting of hydrocarbyl and substituted hydrocarbyl.

4. The catalyst activator according to claim 3 wherein A is Ph$_3$C.

5. The catalyst activator according to claim 1 wherein said second component is Ph$_3$COSO$_2$CF$_3$.

6. The catalyst activator according to claim 1 comprising tris (pentafluorophenyl) boron and Ph$_3$COSO$_2$CF$_3$.

* * * * *